US009348457B2

(12) United States Patent
Church et al.

(10) Patent No.: US 9,348,457 B2
(45) Date of Patent: May 24, 2016

(54) USER INTERFACE TAP SELECTION ON TOUCHSCREEN DEVICE

(71) Applicant: International Business Machines Corporation, Armonk, NY (US)

(72) Inventors: Caroline Church, Andover (GB); Mark P. Frost, Eastleigh (GB); Dominic J. Storey, Eastleigh (GB); John F. Wesley, Southampton (GB); Lakshman S. B. Yatawara, Purley (GB)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 14/458,595

(22) Filed: Aug. 13, 2014

(65) Prior Publication Data

US 2016/0048257 A1 Feb. 18, 2016

(51) Int. Cl.
*G06F 3/041* (2006.01)
(52) U.S. Cl.
CPC .................... *G06F 3/0416* (2013.01)
(58) Field of Classification Search
CPC ............. G06F 3/0488; G06F 3/04886; G06F 17/30882; G06F 17/30905; G06F 2203/04805; G06F 3/041; G06F 3/0416; G06F 3/048
USPC .......................... 345/156, 169, 173, 174, 175
See application file for complete search history.

(56) References Cited

U.S. PATENT DOCUMENTS

| | | | | |
|---|---|---|---|---|
| 2006/0284852 | A1* | 12/2006 | Hofmeister | G06F 3/0483 345/173 |
| 2007/0222769 | A1* | 9/2007 | Otsuka | G01C 21/3664 345/173 |
| 2007/0288841 | A1* | 12/2007 | Rohrabaugh | G06F 9/4443 715/238 |
| 2008/0122796 | A1* | 5/2008 | Jobs | G06F 3/0488 345/173 |
| 2011/0010672 | A1* | 1/2011 | Hope | G06F 3/04817 715/841 |
| 2011/0167375 | A1* | 7/2011 | Kocienda | G06F 1/3203 715/773 |
| 2013/0044061 | A1 | 2/2013 | Ashbrook | |
| 2013/0246861 | A1* | 9/2013 | Colley | G06F 3/0418 714/48 |
| 2013/0305174 | A1* | 11/2013 | Kim | G06F 3/0488 715/765 |
| 2014/0092045 | A1 | 4/2014 | Ananthapadmanabh et al. | |
| 2014/0111462 | A1 | 4/2014 | Townsend et al. | |

OTHER PUBLICATIONS

Archibald, J., "300ms tap delay, gone away," http://updates.html15rocks.com/2013/12/300ms-tap-delay-gone-away (accessed Jun. 9, 2014 3:48 PM).

Lauke, P. et al., "Detecting touch: it's the 'why', not the 'how'," https://hacks.mozilla.org/2013/04/detecting-touch-its-the-why-not-the-how (last modified Apr. 9, 2013; last accessed Jun. 9, 2014 3:50 PM).

(Continued)

*Primary Examiner* — Koosha Sharifi-Tafreshi
(74) *Attorney, Agent, or Firm* — Scully, Scott, Murphy & Presser, P.C.; Rahan Uddin

(57) ABSTRACT

A tap associated with an active area on a user interface of a touchscreen device is received at a first time. The active area is associated with an origination time. It is determined that a period of time between the origination time and the first time is within a specified period of time. In response to the determining, an action associated with the active area is not performed.

17 Claims, 4 Drawing Sheets

(56) References Cited

OTHER PUBLICATIONS

Oracle, "Class ActionEvent," ActionEvent (Java Platform SE 7), http://docs.oracle.com/javase/7/docs/api/java/awt/event/ActionEvent.html (last accessed Jun. 9, 2014 3:58 PM).

Schepers, D., et al., "W3C: Touch Events Extensions, W3C Working Group Note Jun. 5, 2014," Touch Events Extensions, https://dvcs.w3.org/hg/webevents/raw-file/tip/touchevents.html (last accessed Jun. 9, 2014 3:51 PM).

* cited by examiner

USER INTERFACE TAP SELECTION ON TOUCHSCREEN DEVICE

BACKGROUND

The present disclosure relates to touchscreen computing devices, and more specifically, to user interface tap selection on touchscreen computing devices.

Tapping the screen on a touchscreen device is used to select active areas on a user interface. For example, a user may tap the screen to select a link in a web browser. Reflows can cause active areas on a user interface to change location. Reflows may be caused by loading new content, resizing a window, or other events which affect layout of items in a user interface.

SUMMARY

According to embodiments of the present disclosure, a method is disclosed. The method includes receiving, at a first time, a first tap associated with an active area on a user interface of a touchscreen device. The active area is associated with an origination time. The method further includes determining that a period of time between the origination time and the first time is within a specified period of time. The method further includes, in response to the determining, not performing an action associated with the active area.

Further disclosed herein are embodiments of a computer program product. The computer program product includes a computer readable storage medium having program code embodied therewith. The program code is executable by a computer to perform a method. The method includes receiving, at a first time, a first tap associated with an active area on a user interface of a touchscreen device. The active area is associated with an origination time. The method further includes determining that a period of time between the origination time and the first time is within a specified period of time. The method further includes, in response to the determining, not performing an action associated with the active area.

Further disclosed herein are embodiments of a system. The system includes one or more processors, one or more computer-readable memories, one or more computer-readable tangible storage devices, and program instructions stored on at least one of the one or more storage devices for execution by at least one of the one or more processors via at least one of the one or more memories. The program instructions include program instructions to receive, at a first time, a first tap associated with an active area on a user interface of a touchscreen device. The active area is associated with an origination time. The program instructions further include program instructions to determine that a period of time between the origination time and the first time is within a specified period of time. The program instructions further include program instructions to, in response to the determining, not perform an action associated with the active area.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
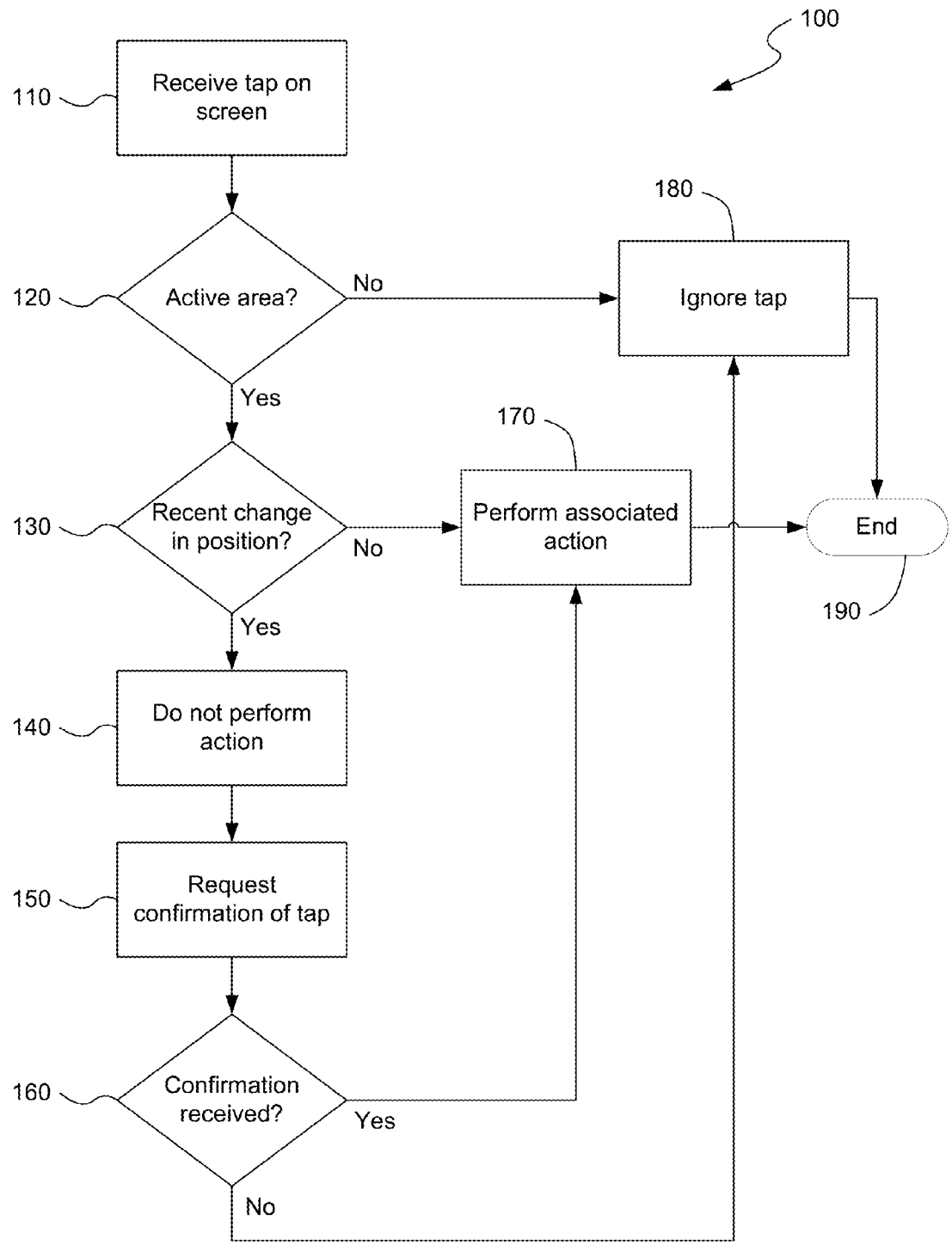
FIG. 1 depicts a flow diagram of an example method for user interface tap selection on a touchscreen device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to user interface tap selection on a touchscreen device, and more particular aspects relate to preventing accidental selection of active areas on a user interface of a touchscreen device. While the present disclosure is not necessarily limited to such applications, various aspects of the disclosure may be appreciated through a discussion of various examples using this context.

Movement of active areas on a user interface of a touchscreen device may cause users to accidentally select an active area. A user may attempt to select an active area and accidently select a different active area when an active area moves just prior to the user tapping the screen. For example, a user may attempt to select a link in a web browser by tapping on its location, but the web browser may reflow just prior to receiving the tap as an image is loaded into the browser.

Embodiments of the present invention may provide for a user interface which ignores, at least temporarily, the selection of an active area if the active area has recently changed location. When a tap is received on a screen, the position may be checked to determine if it is associated with an active area. If the position is associated with an active area, it may be further determined if the active area has changed location recently. If the active area has changed location recently, the tap may be ignored, or confirmation of the tap may be requested.

Referring to FIG. 1, a flow diagram of an example method 100 for user interface tap selection on a touchscreen device is depicted. At block 110, a tap may be received on a screen of a touchscreen device. The touchscreen device may be any touchscreen device such as tablets or mobile phones. At block 120, it may be determined whether the tap is associated with an active area of a user interface on the touchscreen device. The user interface may be any user interface such a web browser. The tap may be associated with the active area if the location of the tap occurred within the active area. There may be multiple active areas on the user interface. Active areas may be associated with performing an action when a tap is received on the active area. The active areas may correspond to links, buttons, text entry windows, or any other selectable item on the user interface. If the tap is not associated with an active area, method 100 may proceed to block 180 and the tap may be ignored. If the tap is associated with an active area, method 100 may proceed to block 130.

At block 130, it may be determined whether the active area recently changed its position. This may include determining the period of time elapsed between an origination time associated with the active area and the time the tap was received. The origination time associated with the active area may indicate the time the active area arrived in its position. For example, the origination time associated with the active area may be when the active area was created or when it was last moved.

A tap-action map, such as those used by web browsers, may be maintained which indicates the locations of active areas on the user interface. A timestamp may be assigned to each active area in the tap-action map when the active area is created or moved. For example, when a link is loaded on to a page in a web browser the tap-action map may be updated to include an active area for the link along with a timestamp. If the link is moved to another location in the browser, the location of the active area associated with the link may be updated on the tap action map and assigned a new timestamp. The timestamp associated with an active area may be compared to a timestamp associated with a received tap to determine the period of time elapsed between the time of the tap and the origination time.

Determining that the active area has changed location recently may include determining the elapsed time period between the time of the tap and the origination time is within a specified time period. The specified time period may be chosen such that it is unlikely that a user intended to select the active area because the active area moved very recently. This time period may be chosen based on average human reaction time. For example, the specified period of time may between 0.15 and 0.30 seconds.

If the active area has not changed location recently (e.g. the tap occurred more than 0.2 seconds after the active area last moved), method 100 may proceed to block 170 and perform the action associated with the active area. There are several actions which may occur depending on the active area. For example, if the active area is a link, the action may be opening a page associated with the link. In another example, the active area may be a text entry box and the action may be providing a text entry tool for a user to enter text into the text entry box.

If the active area has changed location recently (e.g. the tap occurred within 0.2 seconds of the active area moving), method 100 may proceed to block 140 and not perform the action. This may prevent the unintentional performance of an action. If the user did not have the time to recognize the change in location of the active area prior to tapping the screen, it may be unlikely that the user intended to select the active area and perform the associated action. In some embodiments, method 100 may proceed directly to block 180 and ignore the tap.

In some embodiments, method 100 may proceed to block 150 and request confirmation of the tap. In some embodiments, this may include providing a dialog box for confirming the selection. In some embodiments, a zoomed section of the user interface may be provided to the user. The user may be able to confirm the selection by tapping the active area in the zoomed section, may make a different selection in the zoomed section, or may remove the zoomed section, for example, by tapping outside of the zoomed section.

At block 160, it may be determined if a confirmation is received. If a confirmation is received, method 100 may proceed to block 170 and perform the action associated with the active area. If a confirmation is not received, method 100 may proceed to block 180 and ignore the tap. From either block 170 or block 180, method 100 may proceed to block 190 and end.

Figure 2:
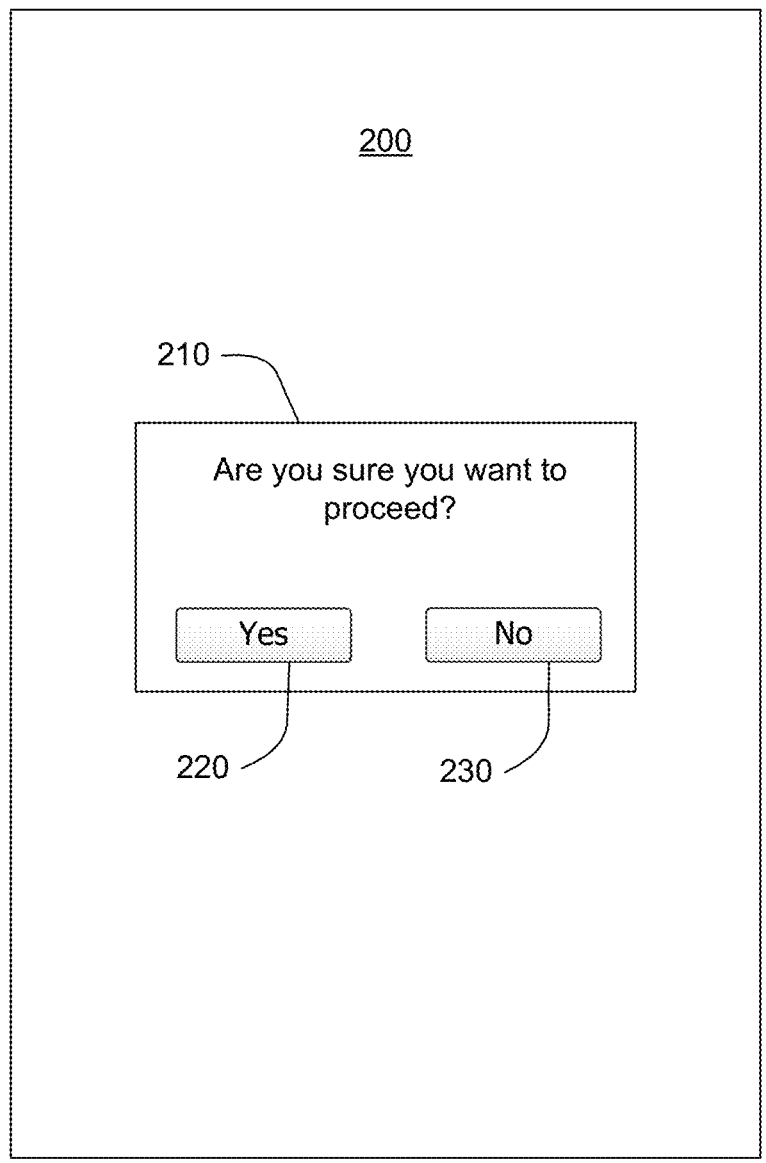
FIG. 2 depicts an example user interface with a dialog box for confirming a tap associated with an active area.

Referring to FIG. 2, an example user interface 200 with a dialog box 210 for confirming a tap associated with an active area is depicted. Dialog box 210 may be provided in response to receiving a tap associated with an active area which recently changed position. Dialog box 210 may contain any text for requesting confirmation of the tap. Dialog box 210 may contain a button for confirming the tap 220 and a button for rejecting the tap 230.

Figure 3B:
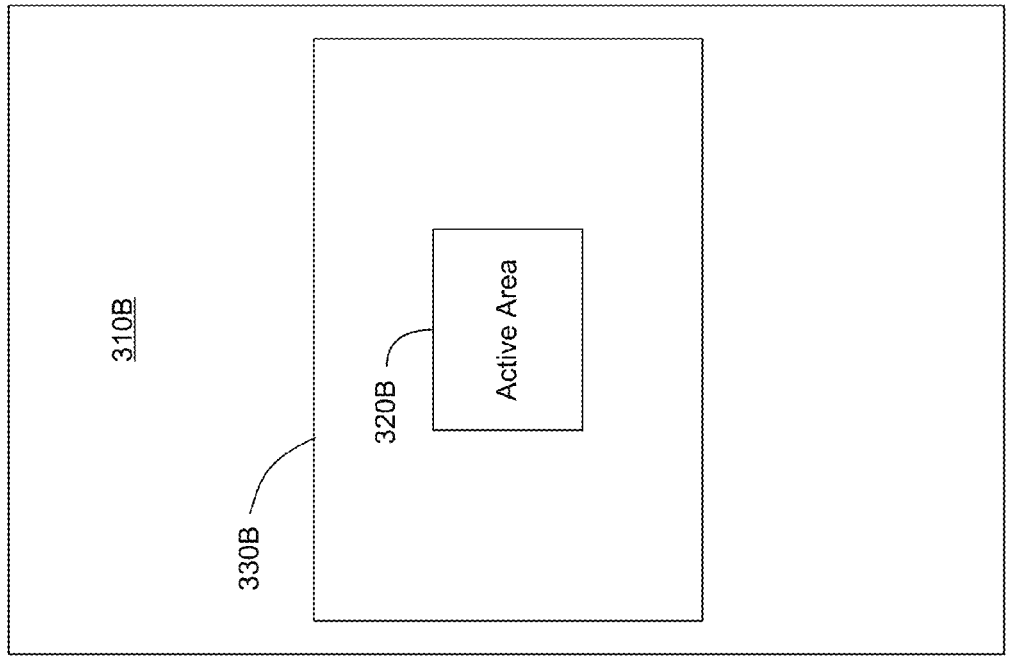
FIG. 3B depicts an example user interface with a zoomed section for confirming a tap selection of an active area.
Figure 3A:
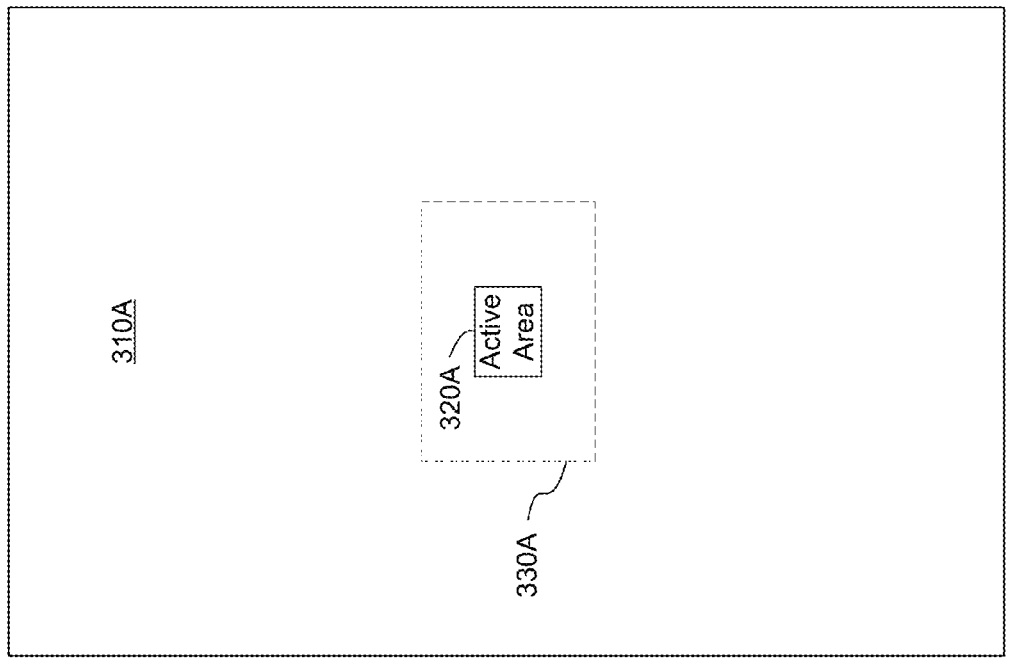
FIG. 3A depicts an example user interface containing an active area prior to receiving a tap.

Referring to FIGS. 3A and 3B, example user interfaces 310A, 310B which provide a zoomed section for confirming a tap are depicted. FIG. 3A depicts an example user interface 310A with an active area 320A. FIG. 3B depicts an example user interface 310B with a zoomed section 330B which contains active area 320B. Zoomed section 330B may be an enlarged window containing area 330A in FIG. 3A.

FIG. 3A may depict an example user interface 310A at a time prior to receiving a tap associated with active area 320A. In response to receiving a tap associated with area 320A, a zoomed section 320B may be provided for confirming the tap. Zoomed section 330B may be an enlarged view of area 330A. The dotted lines bordering area 330A may not be visible to a user of user interface 310A. Similarly, active area 320B may be an enlarged version of active area 320A. A user may confirm the tap by tapping active area 320B in zoomed section 330B. Although not illustrated, zoomed section 330B may contain additional active areas near 320B which may be selected by the user. The user may be able to remove the zoomed section by tapping user interface 310B outside of zoomed section 330B.

Figure 4:
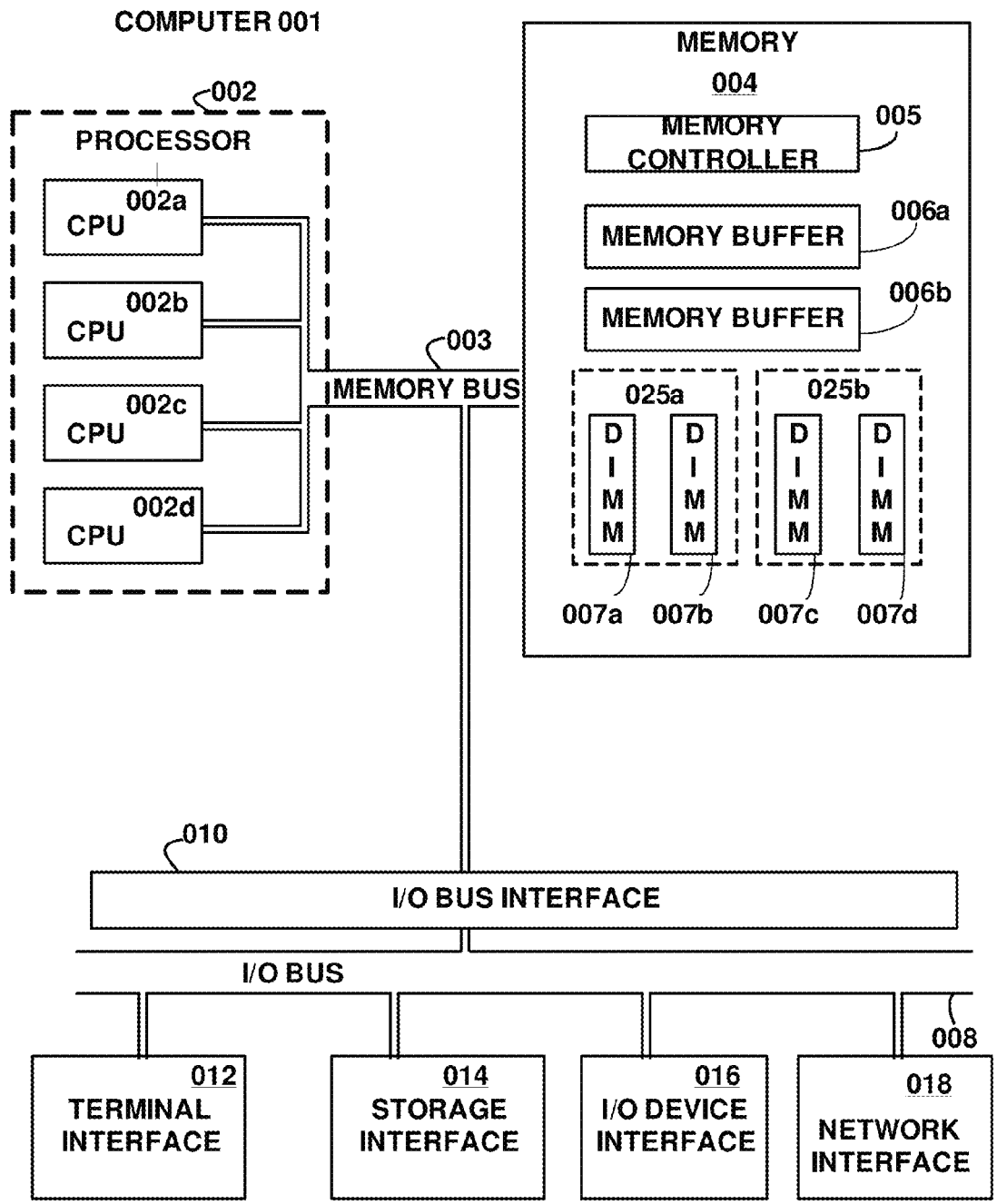
FIG. 4 depicts a high-level block diagram of an example system for implementing one or more embodiments of the invention.

Referring to FIG. 4, a high-level block diagram of an example system for implementing one or more embodiments of the invention is depicted. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 4 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 4 is intended to depict the representative major components of an exemplary computer system 001. But individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving, at a first time, a first tap associated with an active area on a user interface of a touchscreen device, the active area associated with an origination time;
   determining that a period of time between the origination time and the first time is within a specified period of time; and
   in response to the determining, not performing an action associated with the active area, wherein the origination time is identified from a timestamp associated with the active area on a tap-action map associated with the user interface.

2. The method of claim 1, further comprising:
   requesting a confirmation of the first tap;
   receiving the confirmation of the first tap; and
   in response to the receiving the confirmation, performing the action.

3. The method of claim 2, wherein the requesting the confirmation of the first tap comprises providing a dialog box for requesting confirmation.

4. The method of claim 2, wherein the requesting the confirmation of the first tap comprises providing a zoomed section of the user interface, the zoomed section containing the active area, and wherein the receiving the confirmation of the first tap comprises receiving a second tap on the zoomed section associated with the active area.

5. The method of claim 1, wherein the user interface is a web browser.

6. The method of claim 1, wherein the specified period of time is between 0.15 seconds and 0.30 seconds.

7. A computer program product comprising a computer readable storage medium having program code embodied therewith, the program code executable by a computer to perform a method comprising:
   receiving, at a first time, a first tap associated with an active area on a user interface of a touchscreen device, the active area associated with an origination time;
   determining that a period of time between the origination time and the first time is within a specified period of time; and
   in response to the determining, not performing an action associated with the active area, wherein the origination time is identified from a timestamp associated with the active area on a tap-action map associated with the user interface.

8. The computer program product of claim 7, wherein the method further comprises:
   requesting a confirmation of the first tap;
   receiving the confirmation of the first tap; and
   in response to the receiving the confirmation, performing the action.

9. The computer program product of claim 7, wherein the requesting the confirmation of the first tap comprises providing a dialog box for requesting confirmation.

10. The computer program product of claim 7, wherein the requesting the confirmation of the first tap comprises providing a zoomed section of the user interface, the zoomed section containing the active area, and wherein the receiving the confirmation of the first tap comprises receiving a second tap on the zoomed section associated with the active area.

11. The computer program product of claim 10, wherein the user interface is a web browser.

12. A system for generating responses to an electronic communication, the system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to receive, at a first time, a first tap associated with an active area on a user interface of a touchscreen device, the active area associated with an origination time;
   program instructions to determine that a period of time between the origination time and the first time is within a specified period of time; and
   program instructions to, in response to the determining, not perform an action associated with the active area, wherein the program instructions to request the confirmation of the first tap comprise program instructions to provide a zoomed section of the user interface, the zoomed section containing the active area, and wherein the program instructions to receive the confirmation of the first tap comprise program instructions to receive a second tap on the zoomed section associated with the active area.

13. The system of claim 12, wherein the program instructions for execution further comprise:
   program instructions to request a confirmation of the first tap;
   program instructions to receive the confirmation of the first tap; and
   program instruction to, in response to the receiving the confirmation, perform the action.

14. The system of claim 12, wherein the program instructions to request the confirmation of the first tap comprise program instructions to provide a dialog box for requesting confirmation.

15. The system of claim 12, wherein the origination time is identified from a timestamp associated with the active area on a tap-action map associated with the user interface.

16. The system of claim 12, wherein the user interface is a web browser.

17. The system of claim 12, wherein the specified period of time is between 0.15 seconds and 0.30 seconds.

* * * * *